(12) United States Patent  
Bertozzi et al.

(10) Patent No.: US 7,840,086 B2  
(45) Date of Patent: Nov. 23, 2010

(54) METHOD FOR INPAINTING OF IMAGES

(75) Inventors: Andrea L. Bertozzi, Santa Monica, CA (US); Selim Esedoglu, Ann Arbor, MI (US); Alan E. Gillette, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 1061 days.

(21) Appl. No.: 11/543,011

(22) Filed: Oct. 3, 2006

(65) Prior Publication Data

US 2007/0160309 A1 Jul. 12, 2007

Related U.S. Application Data

(60) Provisional application No. 60/726,353, filed on Oct. 12, 2005.

(51) Int. Cl.
*G06K 9/40* (2006.01)

(52) U.S. Cl. .................. 382/254; 382/274; 382/275

(58) Field of Classification Search ............. 382/260, 382/274, 275, 282
See application file for complete search history.

(56) References Cited

U.S. PATENT DOCUMENTS 6,028,971 A * 2/2000 Inuiya et al. ............... 382/312
6,686,136 B1 * 2/2004 Sowinski et al. ........... 430/505
7,088,392 B2 * 8/2006 Kakarala et al. ........... 348/272
7,242,803 B2 * 7/2007 Miller ....................... 382/173
7,460,272 B2 * 12/2008 Hara ......................... 358/1.9

OTHER PUBLICATIONS

Baldo, S., "Minimal Interface Criterion for Phase Transitions in mixtures of Chan-Hilliard Fluids," Ann. Inst. Henri Poincare, Anal. Non Lin., 7, pp. 67-90 (1990).
Bertalmio, M., et al., "Image Inpainting," SIGGRAPH 2000, Computer Graphics Proceedings, K. Akeley, Ed. ACM Press/ACM SIGGRAPH/ Addison Wesley Longman 2000, pp. 417-424 (2000).
Bertalmio, M., et al. "Navier-Stokes, Fluid Dynamics, and Image Video Inpainting." IEEE Computer Vision and Pattern Recognition(CVPR), Hawaii, vol. 1, pp. 1355-1362 (Dec. 2001).
Chan, T.F., et al., "Mathematical Models for Local Nontexture Inpaintings," SLAM Journal on Applied Mathematics, vol. 62, No. 3, pp. 1019-1043 (2001).
Chan, T., et al., "Euler's Elastica and Curvature-Based Inpaintings," SLAM Journal on applied Mathematics, vol. 63, No. 2, pp. 564-592 (2002).
Chan, T.F., et al., "Non-Texture Inpainting by Curvature-Driven Diffusions," Journal of Visual Communication and Image Representation, vol. 12, No. 4, pp. 436-449 (2001).
Chan, T.F., et al., "Euler's Elastica and Curvature Based Inpaintings," SLAM Journal of Mathematics, vol. 63, No. 2, pp. 564-592 (2002).

(Continued)

*Primary Examiner*—Yosef Kassa
(74) *Attorney, Agent, or Firm*—John P. O'Banion

(57) ABSTRACT

Methods for filling in of missing or damaged regions of images using information from surrounding areas are disclosed. A model for binary inpainting based on the Cahn-Hilliard equation is used, which allows for fast, efficient inpainting of degraded text, as well as super-resolution of high contrast images.

17 Claims, 7 Drawing Sheets

(a)

(b)

OTHER PUBLICATIONS

Dalley, G., "Single-Frame Text Super-Resolution: A Bayesian Approach," International Conference on Image Processing, pp. 3295-3298 (2004).

Esedoglu, S., et al., "Digital Inpainting Based on the Mumford-Shah-Euler Image Model," European Journal of Applied Mathematics, vol. 13, pp. 353-370 (2002).

Eyre, D., "An Unconditionally Stable One-Step Scheme for Grading Systems," Unpublished Paper (Jun. 1998).

Glassner, K., "A diffuse interface approach to Hele-Shaw flow," Non-Linearity, vol. 16, pp. 1-18 (2003).

Grossauer, H., et al., "Using the Complex Ginzburg-Landau Equation for Digital Inpainting in 2d and 3d," Scale Space Methods in Computer Vision, Lecture Notes in Computer Science 2695, pp. 225-236 (2003).

March, R., et al., "A variational method for the recovery of smooth boundaries," Image and Vision Computing, vol. 15, No. 9, pp. 705-712 (1997).

Masnou, S., et al., "Level lines based disocclusion," 5th IEEE Int'l. Conf. on Image Processing, Chicago, IL Oct. 4-7 (1998).

MATLAB Online Help Manual <http://www.mathworks.com/access/helpdesk/help/toolbox/vipblks/index.html?/access/helpdesk/help/toolboxvipblks/f13674.html>.

Morse, B., et al., "Image Magnification Using Level-Set Reconstruction," Computer Vision and Pattern Recognition, vol. 1, pp. 333-340 (2001).

Mumford, D., et al., "Optimal Approximations by Piecewise Smooth functions and Associated with Variational Problems," Communications on Pure and Applied Mathematics, vol. 43, pp. 705-712 (1997).

Perona, P., et al., "Scale-Space and Edge Detection using Aisotropic Diffusion," IEEE Trans. Patter Anal. Machine Intell. vol. 12, pp. 629-639 (1990).

Rudin, L., et al., "Nonlinear total variation based noise removal algorithms," Physica D, vol. 60, pp. 259-268 (1992).

Smereka, P., "Semi-Implicit Level Set Methods for Curvature and Surface Diffuse Motion," Journal of Scientific Computing, vol. 19, Nos. 1-3 (Dec. 2003).

Soares, L.D., et al., "Saptial Shape Error Concealment for Object-Based Image and Video Coding," IEEE Transactions on Image Processing, vol. 13, No. 4 (Apr. 2004).

Schuster, G., et al., "Spline-Based Boundary Loss Concealment," Proceedings of the IEEE Int'l. Conf. On Image Processing (2003).

Taylor, J. E., et al., "Linking Anisotropic Sharp and Diffuse Surface Motion Laws via Gradient Flows," Journal of Statistical Physics, vol. 77, Nos. 1/2 (1994).

Vollmayr-Lee, B.P., et al., "Fast and Accurate coarsening stimulation with an unconditionally stable time step," Physical Review E, vol. 68, No. 0066703, pp. 1-13 (2003).

* cited by examiner (a)

(b)

(c)

(d)

(a)

(b)

(c)

(d)

(a)

(b)

(a)

(b)

TABLE I
COMPARISON TESTS, INPAINTING REGION SET TO ZERO

| Method | Inpainting Time (seconds) | |
| --- | --- | --- |
| | Circle | Stripe |
| CDD | >5,400 | >5,400 |
| EE* | >18,000 | >18,000 |
| MSE | 45 | 24 |
| mCH | 24 | 6 |

* 30X30 grid used. All others 128X128.

TABLE I

COMPARISON TESTS, INPAINTING REGION SET TO ZERO

| Method | Inpainting Time (seconds) | |
|---|---|---|
| | Circle | Stripe |
| CDD | >5,400 | >5,400 |
| EE* | >18,000 | >18,000 |
| MSE | 45 | 24 |
| mCH | 24 | 6 |

* 30X30 grid used. All others 128X128.

FIG. 11

TABLE II

COMPARISON TESTS, INPAINTING REGION SET TO RANDOM DATA

| Method | Inpainting Time (seconds) | |
|---|---|---|
| | Circle | Stripe |
| CDD | >270 | >270 |
| EE* | >1,800 | >1,800 |
| MSE | 300 | 30 |
| mCH | 24 | 5 |

* 30X30 grid used. All others 128X128.

FIG. 12

METHOD FOR INPAINTING OF IMAGES

CROSS REFERENCE TO RELATED APPLICATIONS

The present application claims the benefit of provisional application 60/726,353 for "Technique For Inpainting Of High Contrast Images" filed on Oct. 12, 2005, which is incorporated herein by reference in its entirety.

GOVERNMENT SUPPORT

This invention was made with Government support of Grant Nos. N00014-03-1-0888 and N00014-04-1-0078 awarded by the United States Department of the Navy, Office of Naval Research, and Grant Nos. DMS9973341, DMS0410085 and AST0442037 awarded by the National Science Foundation. The Government has certain rights in this invention.

BACKGROUND

1. Field

The present disclosure is directed to image processing and, in particular, to a method for inpainting of images. Those images can be color or greyscale images. In particular, by way of example and not of limitation, the greyscale images can be binary images. A binary image is one with only two different intensities or hues. A black and white image is binary, for example an image made up of printed text. On the other hand, a greyscale image has all grey values between black and white, such as what one might obtain from a photograph of a scene.

2. Related Art

Image inpainting is the filling in of damaged or missing regions of an image with the use of information from surrounding areas. In its essence, it is a type of interpolation. Its applications include restoration of old paintings by museum artists, and removing scratches from photographs.

The pioneering work of Bertalmio, et al. [M. Bertalmio, G. Sapiro, V. Caselles and C. Ballester, "Image inpainting," in *Siggraph* 2000, *Computer Graphics Proceedings*, K. Akeley, Ed. ACM Press/ACM SIGGRAPH/Addison Wesley Longman 2000, pp. 417-424] introduced image inpainting for digital image processing. Their model is based on nonlinear partial differential equations, and imitates the techniques of museum artists who specialize in restoration. They focuse on the principle that good inpainting algorithms should propagate sharp edges into the damaged parts that need to be filled in. This can be done, for instance, by connecting contours of constant greyscale image intensity (called isophotes) to each other across the inpainting region (see also S. Masnou and J. Morel, "Level lines based disocclusion" $5^{th}$ *IEEE Int'l Conf. on Image Processing*, Chicago, Ill. Oct. 4-7, 1998), so that gray levels at the edge of the damaged region extend continuously into the interior. They also impose the direction of the isophotes as a boundary condition at the edge of the inpainting domain.

In subsequent work with Bertozzi [M. Bertalmio, A. Bertozzi, and G. Sapiro, "Navier-Stokes, fluid dynamics, and image and video inpainting." *IEEE Computer Vision and Pattern Recognition* (CVPR), Hawaii, vol.1, pp. 1355-1362, Dec. 2001], they realized that the method in Bertalmio, et al. has intimate connections with two dimensional fluid dynamics through the Navier-Stokes equation. Indeed, the steady state equation proposed in Bertalmio, et al. is equivalent to the inviscid Euler equations from incompressible flow, in which the image intensity function plays the role of the stream function in the fluid problem.

The natural boundary conditions for inpainting are to match the image intensity on the boundary of the inpainting region, and also the direction of the isophote lines ($\nabla^\perp I$). For the fluid problem this is effectively a generalized 'no-slip' boundary condition that requires a Navier-Stokes formulation, introducing a diffusion term. This analogy also shows why diffusion is required in the original inpainting problem. In practice nonlinear diffusion (P. Perona and J. Malik, "Scale-space and edge detection using anisotropic diffusion," *IEEE Trans. Patern Anal Machine Intell*. vol. 12, pp. 629-639, 1990; L. Rudin, S. Osher, and E. Fatemi, "Non linear total variation based noise removal algorithms," *Physica D*, vol. 60, pp. 259-268, 1992) works very well to avoid blurring of edges in the inpainting.

A different approach to inpainting was proposed by Chan and Shen [T.F. Chan and J. Shen, "Mathematical models of local non-texture inpaintings," *SLAM Journal on Applied Mathematics*, vol. 62, no. 3, pp.1019-1043, 2001]. They introduced the idea that well-known variational image denoising and segmentation models can be adapted to the inpainting task by a simple modification. These models often include a fidelity term that keeps the solutions close to the given image. By restricting the effects of the fidelity term to the complement of the inpainting region, Chan and Shen showed that very good image completions can be obtained. The principle behind their approach can be summarized as follows: variational denoising and segmentation models all have an underlying notion of what constitutes an image. In the inpainting region, the models of Chan and Shen reconstruct the missing image features by relying on this built-in notion of what constitutes a natural image.

The first model introduced by Chan and Shen used the total variation based image denoising model of Rudin, Osher, and Fatemi mentioned above. This model can successfully propagate sharp edges into the damaged domain.

However, because of a regularization term, the model exacts a penalty on the length of edges, and thus the inpainting model cannot connect contours across very large distances. Another caveat is that this model does not continuously extend the direction of isophotes across the boundary of the inpainting domain.

Subsequently, Chan, Kang, and Shen [T. Chan, S. Kang and J. Shen, "Euler's elastica and curvature-based inpaintings," *SLAM Journal on Applied Mathematics*, vol. 63, no.2. pp. 564-592, 2002] introduced a new variational image inpainting model that addressed the caveats of the total variation based one. Their model is motivated by the work of Nitzberg, Mumford, and Shiota, [M. Nitzberg, D. Mumford, and T. Shiota, Filtering, *Segmentation, and Depth, ser*. Lecture Notes in Computer Science. Springer-Verlag, 1993, no. 662] and includes a new regularization term that penalizes not merely the length of edges in an image, but the integral of the square of curvature along the edge contours. This allows both for isophotes to be connected across large distances, and their directions to be kept continuous across the edge of the inpainting region.

Following in the footsteps of Chan and Shen, Esedoglu and Shen [S. Esedoglu and J. Shen, "Digital impainting based on the Munford-Shah-Euler image model," *European Journal of Applied Mathematics*, vol. 13, pp. 353-370, 2002] adapted the Mumford-Shah image segmentation model [D. Mumford and J. Shah, "Optimal approximations by piecewise smooth functions and associated with variational problems," *Communications on Pure and Applied Mathematics*, vol. 42, pp. 577-

685, 1989] to the inpainting problem for greyscale images. They utilized Ambrosio and Tortorelli's elliptic approximations [L. Ambrosio and V. M. Tortorelli, "Approximation of functionals depending on jumps by elliptic functionals via gamma convergence," *Communications on Pure and Applied Mathematics*, vol. 43, pp. 999-1036, 1990] to the Mumford-Shah functional. Gradient descent for these approximations leads to parabolic equations with a small parameter $\epsilon$ in them; they represent edges in the image by transition regions of thickness $\epsilon$. These equations have the benefit that highest order derivatives are linear. They can therefore be solved rather quickly. However, like the total variation image denoising model, the Mumford-Shah segmentation model penalizes length of edge contours, and as a result does not allow for the connection of isophotes across large distances in inpainting applications.

In order to improve the utility of the Mumford-Shah model in inpainting, Esedoglu and Shen introduced the Mumford-Shah-Euler image model that, just like the previous work of Kang, Chan, and Shen mentioned above, penalizes the square of the curvature along an edge contour. Following previous work by March [R. March and M. Dozio, "A variational method for the recovery of smooth boundaries," *Image and Vision Computing*, vol. 15, no. 9, pp. 705-712, 1997], they then used a conjecture of De Giorgi [E. De Giorgi, "Some remarks on gamma-convergence and least squares methods," in *Composite Media and Homogenization Theory*, G. D. Maso and G. F. Dell'Antonio, Eds. Birkhauser, 1991, pp. 135-142] to approximate the resulting variational problem by an elliptic one. The resulting gradient descent equations are fourth order, nonlinear parabolic PDE (partial differential equation) with a small parameter in them.

More recently, Grossauer and Scherzer [H. Grossauer and O. Scherzer, "Using the complex Ginzburg-Landau equation for digital inpainting in 2d and 3d", *Scale Space Methods in Computer Vision*, Lecture Notes in Computer Science 2695, pp. 225-236, 2003] have used the complex Ginzburg-Landau equation in a technique for inpainting greyscale images. This method assigns the real part u of a complex quantity w=u+iv to be the greyscale values of the image. The complex quantity w is then forced by their algorithm to reside on a circle of radius 1, centered at the origin, in the complex plane. The complex Ginzburg-Landau equation then leads to a coupled system to be solved for u and v, respectively.

All of the above methods are PDE-based methods. With regard to other kinds of methods for binary inpainting, the closest in spirit are those based on spline continuation of the edges [G. Schuster, X. Li, and A. K. Katsaggelos, "Spline-based boundary loss concealment," *Proceedings of the IEEE International Conference on Image Processing*, 2003; L. D. Soares and F. Pereira, "Spatial shape error concealment for object-based image and video coding," *IEEE Trans. Image Proc.* vol. 13, no. 4, 2004]. This approach is very fast for simple regions and the complexity of the algorithm depends on the number of edges involved in the inpainting problem.

SUMMARY

According to a first embodiment, a method for filling in of damaged or missing regions of an image by way of information from surrounding areas is disclosed, said image being defined in a first domain, said filling in being defined in a second domain contained in the first domain, the method comprising: representing the image as an image function; solving a differential equation related to the image function, the nonlinear potential function comprising a fidelity term and a parameter to measure a transition region between states.

Additional embodiments of the present disclosure are recited in the enclosed claims section.

In contrast with previous PDE-based methods, the PDE-based method according to the present disclosure is O(NlogN), regardless of the complexity of the image, where N=n×n is the number of pixels in a square region surrounding the inpainting domain. The log correction is due to the use of the FFT (Fast Fourier Transform) for solving an implicit equation.

BRIEF DESCRIPTION OF THE FIGURES

FIGS. 7A-7D show an example of super-resolution of text.
FIGS. 11 and 12 show timing results for the illustrated methods.

DETAILED DESCRIPTION

Figure 1:
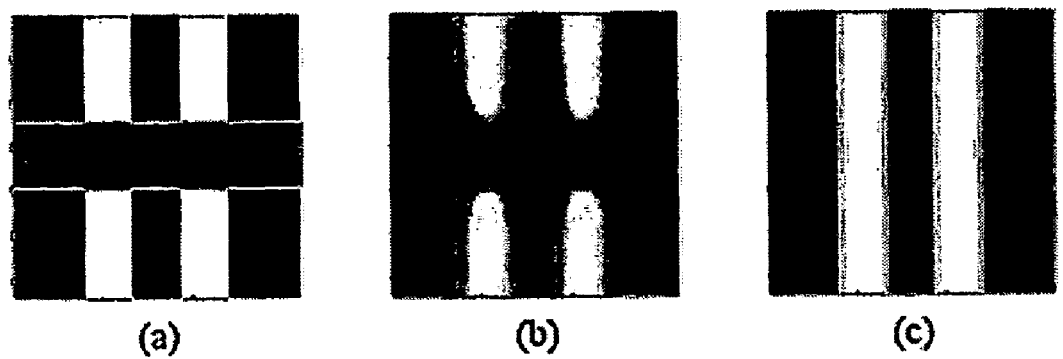
FIGS. 1A-1C show inpainting of a double stripe.

The applicants' idea is that a much simpler class of models exist that still has many of the desirable properties of the model introduced in the Esedoglu and Shen paper mentioned above, but for which there are very fast computational techniques available. In particular, Applicants show that in the case of high-contrast or binary images, a slightly modified Cahn-Hilliard equation allows Applicants to obtain inpaintings as good as the ones in previous papers, but achieves them much more rapidly. This faster method is a result of both a new simplified PDE model and the use of fast solvers for such a model.

Let $f(\vec{x})$, where $\vec{x}=(x,y)$, be a given image in a domain $\Omega$, and suppose that $D \subset \Omega$ is the inpainting domain. Let $u(\vec{x},t)$ evolve in time to become a fully inpainted version of $f(\vec{x})$ under the following equation:

$$u_t = -\Delta\left(\varepsilon\Delta u - \frac{1}{\varepsilon}W'(u)\right) + \lambda(\vec{x})(f - u) \quad (1)$$

where $$\lambda(\vec{x}) = \begin{cases} 0 & \text{if } \vec{x} \in D, \\ \lambda_0 & \text{if } \vec{x} \in \Omega \backslash D \end{cases}$$

The function W(u) is a nonlinear potential with wells corresponding to values of u that are taken on by most of the greyscale values. In the examples considered here, applicants use binary images in which most of the pixels are either exactly black or white. In this binary case, W should have wells at the values u=0 and u=1. In the examples presented in the present application, Applicants use the function $W(u)=u^2(u-1)^2$, however other functions could be used. Applicants assume that the image function $u(\vec{x},t)$ takes on greyscale values in a domain $\Omega$ and satisfies periodic boundary conditions on $\partial\Omega$. Alternatively, Neumann boundary conditions could be used, or any boundary conditions for which one can use fast solvers for the equation (see discussion below).

Equation (1) is what the Applicants will call the modified Cahn-Hilliard equation, due to the added fidelity term $\lambda(\vec{x})(f-u)$. The presence of this term insures that the result matches the known data $f$ in the region where it is known. The word "fidelity" applies to the known data.

The role of $\epsilon$ in equation 1 is worth mentioning. In the original Cahn-Hilliard equation, $\epsilon$ serves as a measure of the transition region between two metals in an alloy, after heating and reaching a steady state. Applied to image processing, $\epsilon$ is a measure of the transition region between the two greyscale states—for example between the black and white of printed text.

Another important feature of relevance of the present disclosure is that fast solvers exist for the numerical integration of the Cahn-Hilliard equation and similar diffuse interface equations. To date no such solvers have been applied to these problems in the context of imaging applications, and the applicants believe that this synergistic combination of a simpler PDE-based method and a state-of-the-art fast solver provides significant improvement over the previous state-of-the-art.

Here Applicants demonstrate how to implement this idea using a specific fast solver known as convexity splitting [D. Eyre, "An unconditionally stable one-step scheme for gradient systems," Unpublished paper, Jun. 9, 1998; B. P. Vollmayr-Lee and A. D. Rutenberg, 'Fast and accurate coarsening simulation with an unconditionally stable time step," *Physical Review E*, vol. 68, no. 0066703, pp. 1-13, 2003]. Convexity splitting decomposes the energy functional into two parts—a convex energy plus a concave energy. Then one evolves the gradient flow for the Euler-Lagrange equation using a semi-implicit timestep in which the convex part of the energy is implicit and the concave part explicit. Under the right conditions, this convexity splitting results in an unconditionally stable time-discretization scheme, allowing for arbitrarily large time steps. Vollmayr-Lee and Rutenberg [see reference mentioned above] have recently refined the conditions under which stability is applicable for the original Cahn-Hilliard equation. The efficiency of the solver involves a speedup both in the temporal evolution and the solution of the spatial operator over each timestep. Convexity splitting allows for an unconditionally stable time step thereby allowing the user to take very large timesteps without stability being an issue. Moreover, there is a convenient way to choose the splitting so that the spatial operator to be solved on any given timestep can easily be discretized using the FFT (fast Fourier transform). The combination of efficient temporal discretization with fast spatial solution results in a method that can compute good inpainting solutions much more rapidly than previously proposed methods.

The new modified Cahn-Hilliard equation in accordance with the present disclosure is not strictly a gradient flow. The original Cahn-Hilliard equation (equation (1) with $\lambda=0$) is indeed a gradient flow using an $H^{-1}$ norm for the energy $$E_1 = \int_\Omega \frac{\varepsilon}{2}|\nabla u|^2 + \frac{1}{\varepsilon}W(u)d\vec{x}, \quad (2)$$

while the fidelity term in equation (1) can be derived from a gradient flow under an $L^2$ norm for the energy $$E_2 = \lambda_0 \int_{\Omega \setminus D}(f-u)^2 d\vec{x}. \quad (3)$$

But in total, the modified Cahn-Hilliard equation in accordance with the present disclosure is neither a gradient flow in $H^{-1}$ nor $L^2$. For a discussion of Cahn-Hilliard and gradient flows in $H^{-1}$ see Taylor and Cahn [J. Taylor and J. Cahn, "Linking anisotropic sharp and diffuse surface motion laws via gradient flows," *J Stat. Phys.*, vol. 77, pp. 183-197, 1994]. However, the idea of convexity splitting, one for the Cahn-Hilliard energy in equation (2) and one for the energy $E_2$ in equation (3), can still be applied to this problem with good results.

For example, one can split $E_1$ as $$E_1 = E_{11} - E_{12} \quad (4)$$

where $$E_{11} = \int_\Omega \frac{\varepsilon}{2}|\nabla u|^2 + \frac{C_1}{2}|u|^2 d\vec{x} \quad (5)$$

and $$E_{12} = \int_\Omega -\frac{1}{\varepsilon}W(u) + \frac{C_1}{2}|u|2 d\vec{x} \quad (6)$$

Note that $-E_{12}$ is not strictly concave however in practice one can choose $C_1$ so that it is concave over the range of values of $u$ empirically observed in the simulation.

Likewise, $E_2$ can be rewritten as $$E_2 = E_{21} - E_{22} \quad (7)$$

where $$E_{21} = \int_{\Omega \setminus D} \frac{C_2}{2}|u|^2 d\vec{x} \quad (8)$$

and $$E22 = \int_{\Omega \setminus D} -\lambda_0(f-u)^2 + \frac{C_2}{2}|u|^2 + d\vec{x}. \quad (9)$$

For the splittings discussed above, the resulting time-stepping scheme is:

$$\frac{u^{n+1} - u^n}{\Delta t} = -\nabla_H-1(E_{11}^{n+1} - E_{12}^n) - \nabla_L 2(E_{21}^{n+1} - E_{22}^n) \quad (10)$$

where $\nabla_{H^{-1}}$ and $\nabla_L 2$ represent gradient descent with respect to the $H^{-1}$ inner product, and $L^2$ inner product, respectively. This translates to a numerical scheme of the form $$\frac{u^{n+1} - u^n}{\Delta t} + \varepsilon \nabla^4 u^{n+1} - C_1 \nabla^2 u^{n+1} + C_2 u^{n+1} = \nabla^2\left(\frac{1}{\varepsilon}W'(u^n)\right) + \lambda(\vec{x})(f(\vec{x}) - u^n) - C_1 \nabla^2 u^n + C_2 u^n \quad (11)$$

The constants $C_1$ and $C_2$ are positive; they should be large enough so that $E_{11}, E_{12}, E_{21}$, and $E_{22}$ are convex for the range of $u$ in the simulation. In practice, $C_1$ is comparable to $$\frac{1}{\varepsilon}$$

while $C_2$ is comparable to $\lambda_0$. Numerical tests show that with these choices the scheme (11) is unconditionally stable. Equation (11) for $u^{n+1}$ then involves only constants and the Laplace operator applied to the new time level. On a square domain, with periodic or Neumann boundary conditions, one can solve this efficiently using a pseudo-spectral method based on a Fast-Fourier-Transform (FFT) method [P. Smereka, "Semi-implicit level set methods for curvature flow and for motion by surface diffusion," *J. Sci. Comp.* vol. 19, pp. 439-456, 2003;K. Glasner, "A diffuse interface approach to hele-shaw flow," *Nonlinearity*, vol. 16, pp.1-18, 2003].

The main idea is that the operators applied to $u^{n+1}$ have the same eigenfunctions as the FFT, and thus are diagonalizable using this decomposition. We present some examples below and state the parameters used for $\Delta t$, $C_i$, $\lambda$, and $\epsilon$.

Finally the applicants note that one can perform inpainting across larger regions by considering an embodiment including a two-step method. The inpainting is done first with a larger $\epsilon$, which results in topological reconnection of shapes with edges smeared by diffusion. The second step then uses the results of the first step and continues with a much smaller value of $\epsilon$ in order to sharpen the edge after reconnection. In practice such a two-stage process can result in inpainting of a stripe across a region that is over ten times the width of the stripe, without any a priori knowledge of the location of the stripe.

EXAMPLES

The modified Cahn-Hilliard equation in accordance with the present disclosure lends itself particularly well to the inpainting of simple binary shapes, such as stripes and circles. Moreover, its applicability can be extended to achieve inpainting of objects composed of stripes and circles, i.e., roads or text. The applicants show several examples performed on a Linux desktop system using a Pentium 4 processor, and programmed in MATLAB.

(1) Inpainting of a Double Stripe

FIG. 1A-1C shows a two-step process. The gray region in FIG. 1A denotes the inpainting region. The process begins with $\epsilon$ (=0.8), and at t=50 a steady state is reached, shown in FIG. 1B. The process then switches to a small value of $\epsilon$ (=0.01), using the result from FIG. 1B as initial data. The final result is at t=700 and is shown in FIG. 1C. The gap distance is 30 units. The image domain is 128×128. The total CPU time is 11.5 sec. $\Delta t=1$, $\lambda=50,000$, C1=300 and C2=150,000.

(2) Inpainting of a Cross

Figure 2:
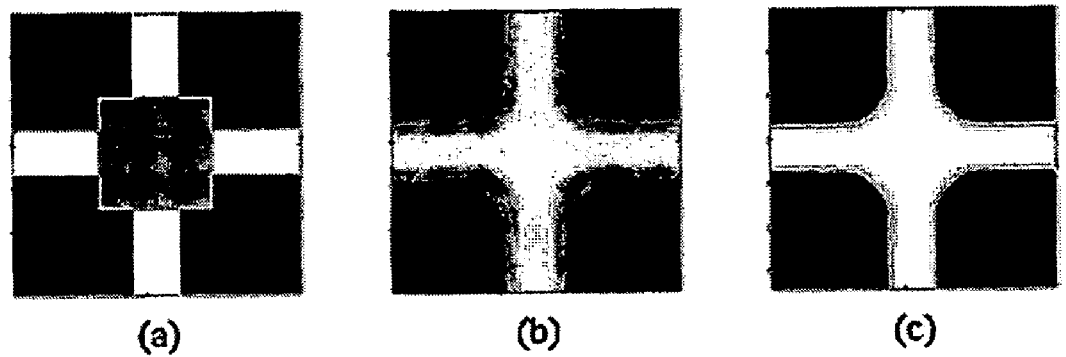
FIGS. 2A-2C show inpainting of a cross.

In FIG. 2A, the gray region denotes the inpainting region. As with the stripes, the modified Cahn-Hilliard equation is run to steady state for a large value of $\epsilon$ (=0.8), resulting in FIG. 2B at t=300. This data is then used as initial data for the modified Cahn-Hilliard equation with $\epsilon$ (=0.01) set to a small value. The final result is a completed cross at t=1000. The initial gap distance is 50 units. The image domain is 128×128. The total CPU time is 15.6 sec. $\Delta t=1$, $\lambda=100,000$, C1=300 and C2=300,000.

(3) Inpainting of a Sine Wave

Figure 3:
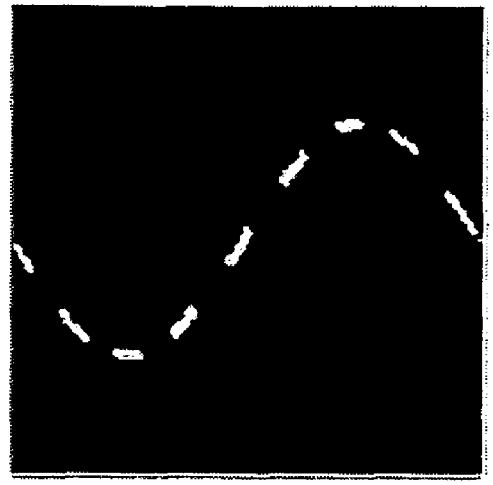
FIGS. 3A-3D show inpainting of a sine wave.
Figure 3:
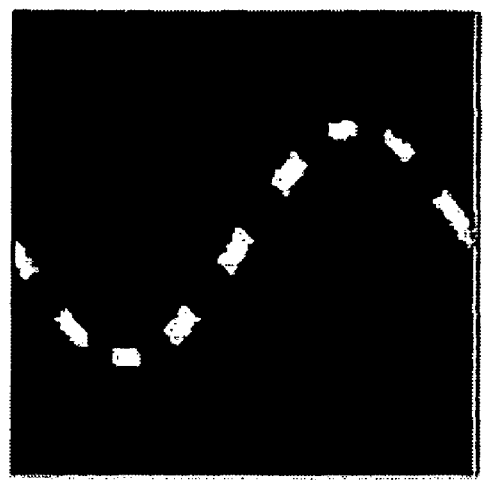
Figure 3:
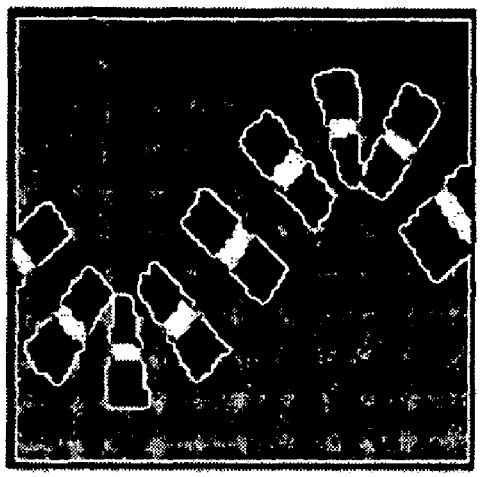
Figure 3:
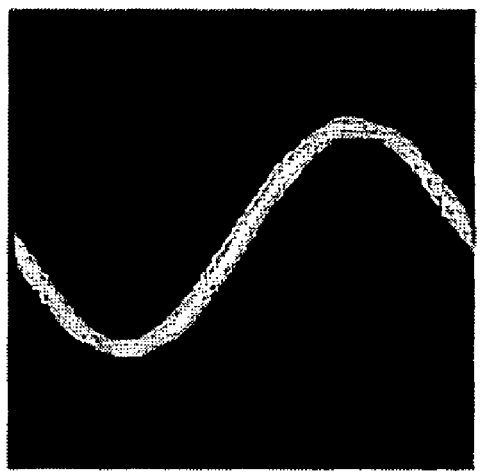

FIGS. 3A-3D show how the modified Cahn-Hilliard equation in accordance with the present disclosure may be applied to the inpainting of simple road-like structures. In FIG. 3A, an incomplete sine wave is shown. In FIG. 3B, the sine wave is artificially "fattened" by expanding each white point's area radially by a factor of 3. This is done in order to give the modified Cahn-Hilliard equation sufficient boundary conditions for effective inpainting. In FIG. 3C, the gray area represents the inpainting region. The remaining white and black portions of the image are thus outside the inpainting region, and essentially held fixed in place by the fidelity term of the modified Cahn-Hilliard equation (1). The two-step method was then used to inpaint the sine wave. FIG. 3D shows the final result. The initial value of $\epsilon$ was taken to be 0.8, and then at t=200 this was switched to a value of $\epsilon=0.01$. The final inpainting result was taken at t=4000. The image domain is 128×128. The total CPU time is 35.1 sec. $\Delta t=1$, $\lambda=80,000$, C1=300 and C2=3$\lambda$.

(4) Inpainting of a Road

Figure 4:
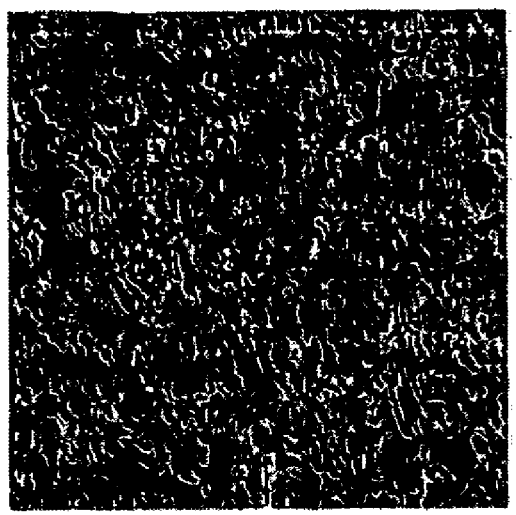
FIGS. 4A-4D show inpainting of a road.
Figure 4:
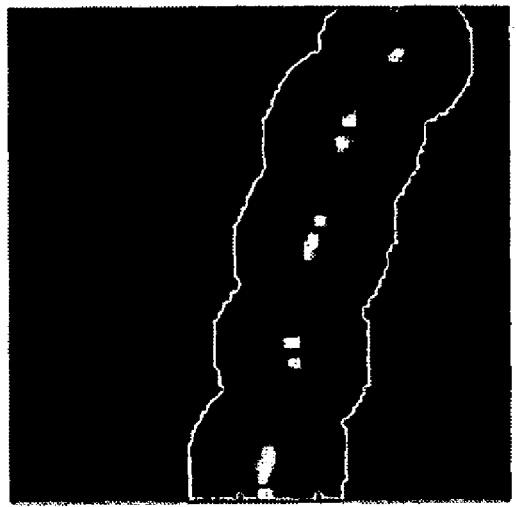
Figure 4:
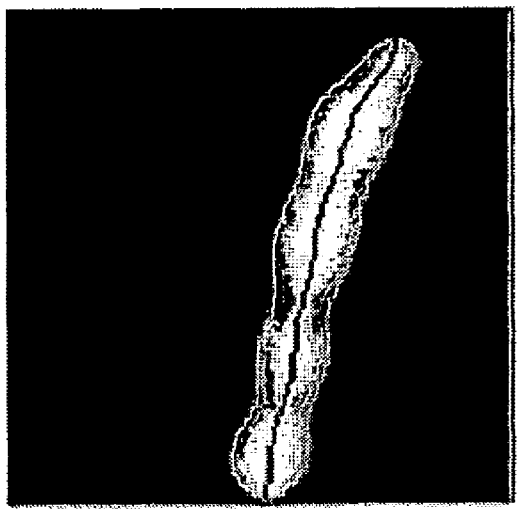
Figure 4:
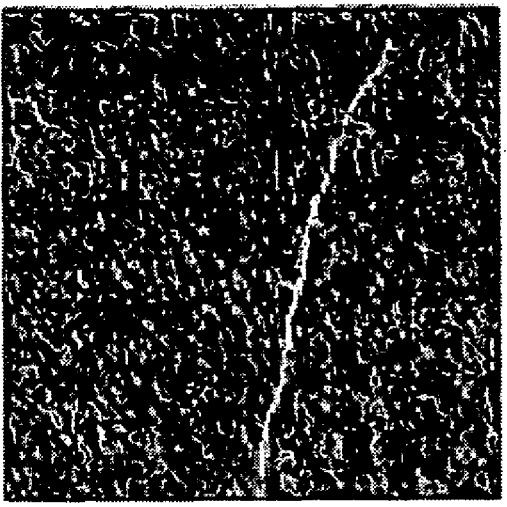

FIG. 4A shows a satellite image of a road passing through a forest in Washington state. After a simple thresholding of greyscale values, the visible pieces of the road are shown as the white regions in FIG. 4B. The gray area in FIG. 4B represents the inpainting region, which was found by creating a circle about each established point of the road, the radius of which was chosen to be the maximum estimated gap length between existing portions of the road. Note that each thresholded white point of the road has been expanded in radius, as for the sine wave in FIG. 3B. In the original satellite photo, the road actually has an average width of about 1 pixel, making it very difficult to establish meaningful boundary conditions for the inpainting problem.

In FIG. 4C, the steady state has been reached using the modified Cahn-Hilliard equation, via the aforementioned two-step process. The result in FIG. 4C is too thick, but the resulting centerline, overlaid on the initial satellite photo, shows, in FIG. 4D, a close estimation of the path when overlayed on the original photograph. The initial value for $\epsilon$ was 0.8 and was switched at t=100 to $\epsilon=0.005$. The final result was taken at t=500. The image domain is 128×128. The total CPU time is 8.5 sec. $\Delta t=1$, $\lambda=1,000,000$, C1=30,000 and C2=3,000,000. Much more efficient inpainting, as in FIGS. 3A-3C, could be done with a more precise estimation of the inpainting region.

(5) Recovery of Text

Figure 5:
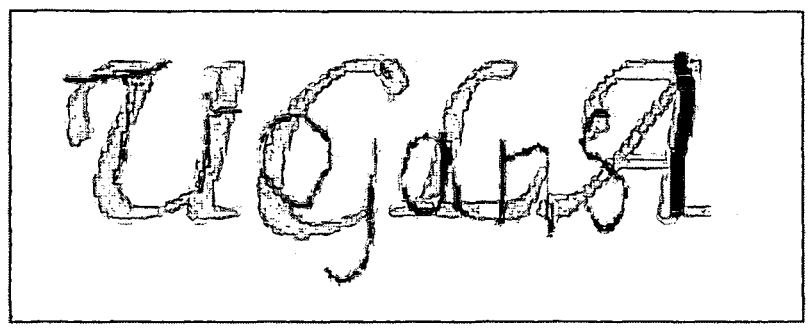
FIGS. 5A-5B and 6A-6B show restoration of damaged text.
Figure 5:
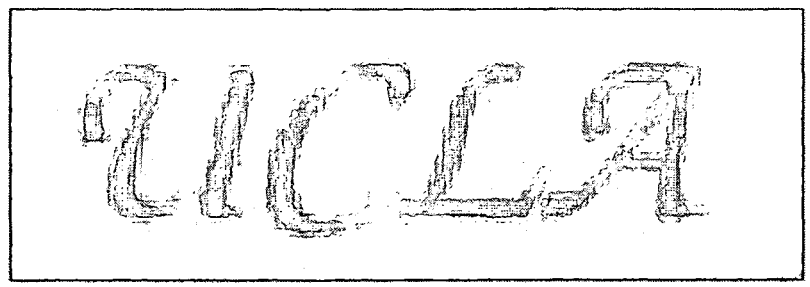

In FIG. 5A, several lines obscure some Arabic writing. Using these obstructing lines as the inpainting region, the modified Cahn-Hilliard two-step scheme can inpaint the occluded parts of the writing. The initial value for $\epsilon$ was 0.08. At t=100, $\epsilon$ was switched to 0.01. The program was then run to 200 time steps and the result is shown in FIG. 5B. The image domain is 256×256. The total CPU time is 22.4 sec. $\Delta t=1$, $\lambda=50,000,000$, C1=10,000 and C2=150,000,000.

Figure 6:
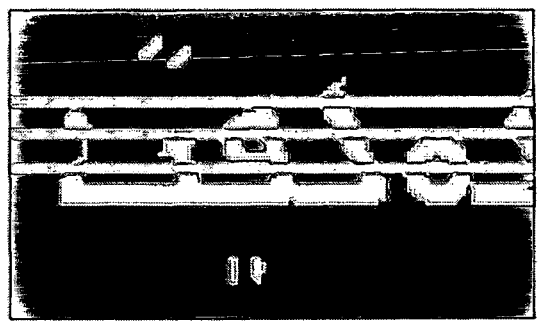
Figure 6:
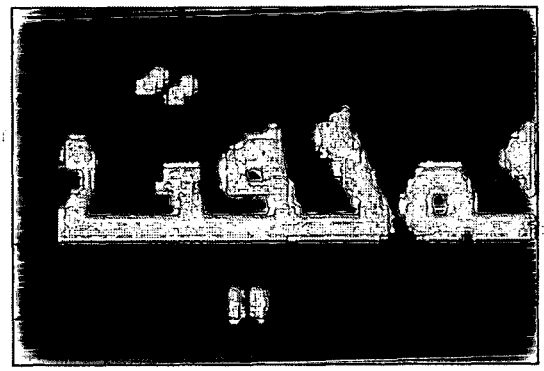

In FIG. 6A, graffiti is written over the UCLA logo. Using the graffiti as the inpainting region, applicants have restored the image using the two-step method. Until t=100, a large value of $\epsilon$ (=0.8) is used. At t=100, $\epsilon$ is switched to a small value (=0.003). The final result in FIG. 6B at t=120 is the restored logo. The image domain is 256×256. The total CPU time is 13.25 sec. $\Delta t=1$, $\lambda=50,000,000$, C1=15,000 and C2=150,000,000.

(6) Super-resolution

The modified Cahn-Hilliard equation in accordance with the present disclosure can also be used for the purposes of super-resolution of text. This application has been studied by other PDE-based methods [M. Bertalmio, A. Bertozzi, and G. Sapiro, "Navier-Stokes, fluid dynamics, and image and video inpainting." *IEEE Computer Vision and Pattern Recognition* (CVPR), Hawaii, vol.1, pp. 1355-1362, December 2001; B. D. Morse and D. Schwartzwald, "Image magnification using level-set reconstruction," *Computer Vision and Pattern Recognition*, vol. 1, pp. 333-340, 2001] as well as by many other classes of algorithms [e.g. G. Dalley, B. Freeman, and J.

Marks, "Single-frame text super-resolution: a Baysian approach," *International Conference on Image Processing*, pp. 3295-3298, 2004] and thus it is natural to consider here. Latin writing is shown in FIG. 7A, of size 64×64. FIG. 7B shows the text enlarged by 3× using MATLAB's "nearest-neighbor" algorithm. See, for example, the MATLAB online help manual at http://www.mathworks.com/access/helpdesk/help/toolbox/vipblks/index.html?/acce ss/helpdesk/help/toolbox/vipblks/f13674.html. First, the white region of FIG. 7B is subsampled to provide initial data for inpainting. Next, the modified Cahn-Hilliard algorithm runs until t=40 using a very large fidelity constant, $\lambda$=50,000,000, and very small $\epsilon$ (=0.005). After t=40, $\lambda$ is set equal to zero, and the ordinary Cahn-Hilliard equation is allowed to run on the text. This allows for the smoothing of jagged parts of the text, as shown in FIG. 7B. FIGS, 7C and 7D show the results at t=350 and t=450 respectively. The total CPU time is 17.4 sec. $\Delta t$=1, C1=300 and C2=150,000,000.

Comparison with Other Methods

Figures 7, 8:
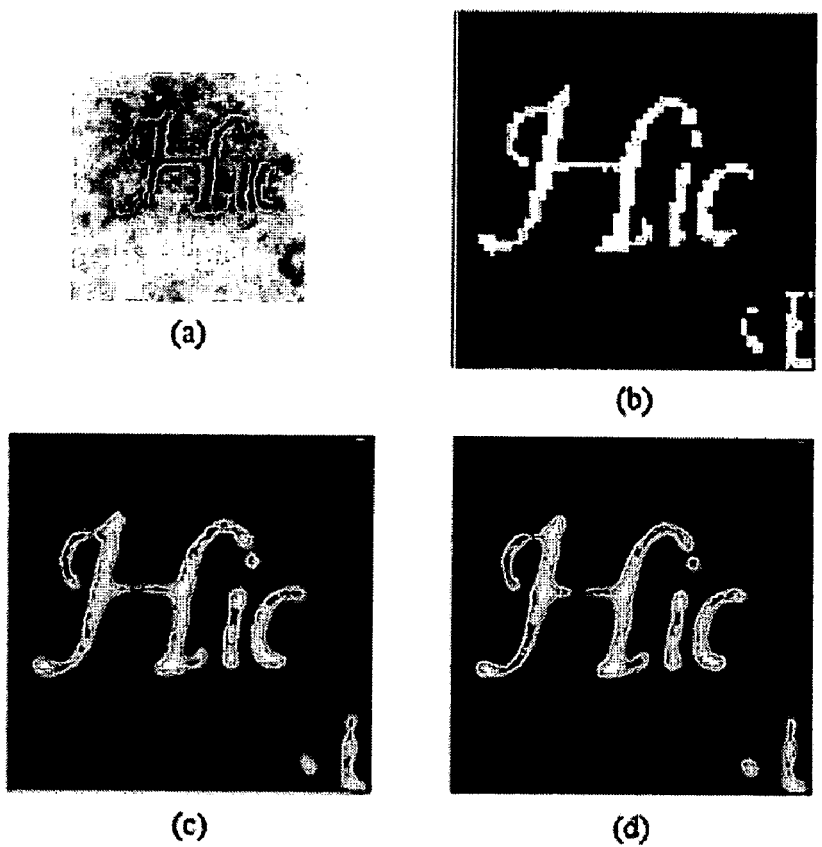
FIG. 8 shows a comparison table between the method according to the present disclosure and other methods.

FIG. 8 shows a comparison table between the method according to the present disclosure and other methods. One of the chief benefits of using the modified Cahn-Hilliard (mCH in FIG. 8) equation to do inpainting are the fast numerical techniques available for its solution. To quantitatively determine how much faster this makes the modified Cahn-Hilliard equation than other PDE inpainting techniques, a series of comparison tests were run. The methods we tested against were the Curvature Driven Diffusion (CDD) inpainting model of Chan and Shen [T.F. Chan and J. Shen, "Non-texture inpainting by curvature-driven diffusions," *Journal of Visual Communication and Image Representation*, vol. 12, no. 4, pp. 436-449, 2001], the Euler's Elastica (EE) inpainting model of Chan, Kang, and Shen [T. Chan, S. Kang and J. Shen, "Euler's elastica and curvature-based inpaintings," SLAM *Journal on Applied Mathematics*, vol. 63, no.2. pp. 564-592, 2002], and the Mumford-Shah-Euler (MSE) inpainting model of Esedoglu and Shen [S. Esedoglu and J. Shen, "Digital impainting based on the Munford-Shah-Euler image model," *European Journal of Applied Mathematics*, vol. 13, pp. 353-370, 2002]. Each method was tested on two examples—inpainting a ¾circle, and inpainting a disconnected stripe. All tests were run on the same system used in the examples shown above (with the exception that the EE method was programmed in C++).

Figure 9:
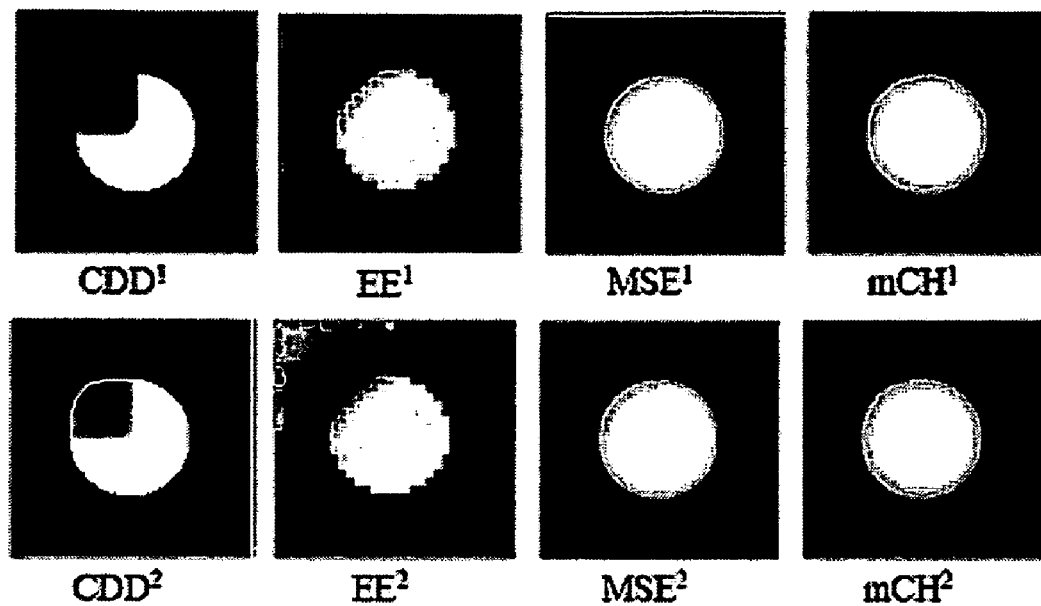
FIGS. 9 and 10 show comparative results for the circle inpainting test and the stripe inpainting test, respectively.
Figure 10:
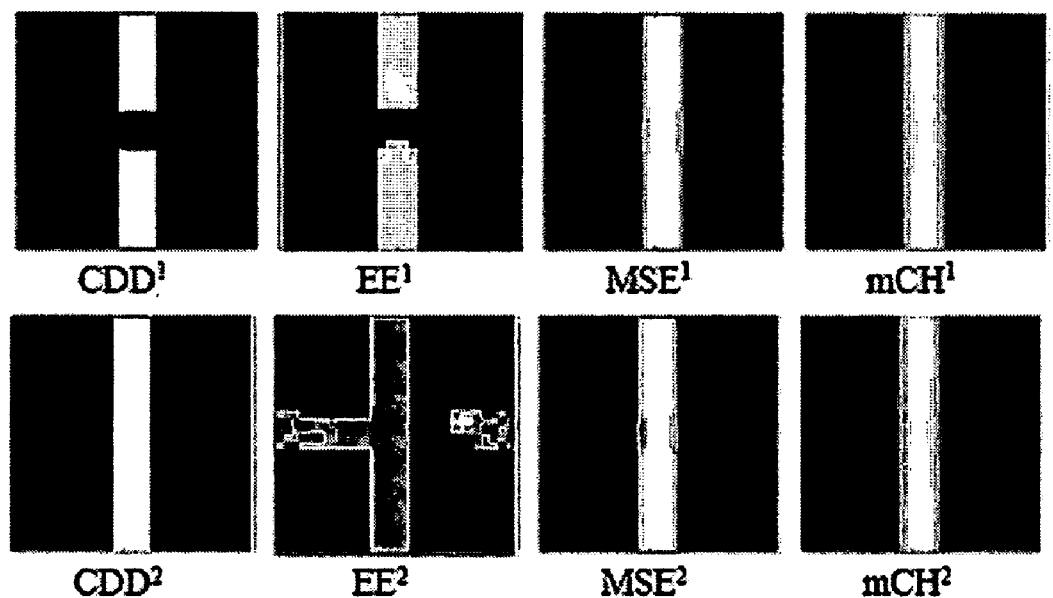

FIGS. 9 and 10 show the performance of each inpainting method on the circle (superscript 1) and stripe (superscript 2) tests, respectively. As can be seen in FIG. 9, CDD requires random data to begin inpainting the circle (CDD$^2$). The EE method fared well on the circle test with zero initial data in the inpainting region (EE$^1$), but became mired when the test was started with random data there (EE$^2$). The MSE and mCH methods, however, had no strict preference for the initial data in the inpainting region. Results were the same whether random or zero initial data was assumed (MSE$^{1,2}$, mCH$^{1,2}$).

Tabulated Results

FIGS. 11 and 12 show Tables I and II the timing results for each method. In particular, Table I relates to comparison tests where the inpainting region is set to zero, while Table II relates to comparison tests where the inpainting region is set to random data.

In summary, the applicants have shown how the Cahn-Hilliard equation can be modified to achieve fast inpainting of binary or greyscale imagery. This modified Cahn-Hilliard equation can be applied to the inpainting of simple binary shapes, text reparation, road interpolation, and super-resolution. The two-step process employed by Applicants, described above, allows for effective inpainting across large unknown regions. Although it works best when the end-user to specifies the inpainting domain, this method can also be used for interpolating simple roads and other situations where a user-defined inpainting region is not feasible. Through a two-step process, the method can inpaint across large gaps in a repeatable way. Although multiple solutions, including broken connections, may be possible mathematically, the method can find a continuous solution by first performing very diffuse but continuous connection, and then using this state as initial data for a subsequent inpainting with sharp transitions between white and black regions.

In the context of greyscale or binary image inpainting, the modified Cahn-Hilliard equation has displayed a considerable decrease in computation time when compared with other PDE-based inpainting methods. Fast numerical techniques available for the Cahn-Hilliard equation also allow for efficient computation with relatively large datasets.

In summary, the algorithm adopted by the method in accordance with the present disclosure adds together two different variational methods to obtain a hybrid scheme that does not appear to have a variational description. By doing that, a method is obtained that is simpler to compute that previous variational methods and it is much faster as shown in the examples computed. A differential equation related to the intensity function is solved. In one of the embodiments shown above, the differential equation is the sum of two terms, one of which optimizes for a match to the known data outsize the inpainting region, the other optimizes for separation of scales between the two different binary levels of the image.

The second term is based on the Cahn-Hilliard equation, which is a diffuse interface model for the separation of two phases, in which length of the boundary between the phases decreases while maintaining the total volume of each phase. The fact that this term is a fourth order term results in an algorithm that matches both binary state and the direction of the edge between the states, at the edge of the inpainting region.

The method described so far is principally designed for binary images. Two quantized states are present. According to the method as disclosed, interpolation in such images has been shown by use of a separation of scales between the two states with a diffusive lengthscale. The greyscale and color cases are extensions from the binary case, where more than two quantized states are present, so that additional quantization of pixel levels in the algorithm is present.

An extension of this method to greyscale and color can be accomplished by considering related Cahn-Hilliard models for multiple states. For example, there is a vectorial model with symmetric wells, to Baldo [S. Baldo. "Minimal interface criterion for phase transitions in mixtures of Cahn-Hilliard fuids". Ann. Inst. Henri Poincare, Anal. non Lin., 7 (1990), pp. 67-90], for the study of phase transitions in mixtures. A more concise representation could be modeled on the multiphase segmentation model of Chan and Vese [A Multiphase Level Set Framework for Image Segmentation Using the Mumford and Shah Model Luminita A. Vese and Tony F. Chan, International Journal of Computer Vision 50(3), 271-293, 2002]. To use their image representation method in the context of Cahn-Hilliard inpainting, an n-bit image (corresponding to $2^n$ greyscale values) can be represented using a system of n Cahn-Hilliard type equations coupled through a fidelity term.

Another natural extension of this method is for application in which an FFT may not be practical due to the need for embedded software on a chip or the geometry of the application. Other fast decomposition methods exist, including wavelet-based methods. For such applications, the Laplace operator in equation (1) can be replaced by a linear operator with eigenfunctions corresponding to basis elements of the fast decomposition (for example wavelets). The corresponding eigenvalues of the linear operator should have some dependence on spatial scale, as in the case of the Laplace operator.

All references cited in the present application are incorporated herein by reference in their entirety.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

What is claimed is:

1. A computer, comprising:
   a processor;
   programming executable on said processor for carrying out a method for filling in of damaged or missing regions of an image by way of information from surrounding areas, said image being defined in a first domain, said filling in being defined in a second domain contained in the first domain, the method comprising:
   representing the image as an image function; and
   solving a differential equation related to the image function, said differential equation comprising a fidelity term and a parameter to measure a transition region between states.

2. The computer of claim 1, wherein said solving a differential equation is performed in a first step where a first value of the parameter is adopted and a subsequent second step where a second value of the parameter, smaller than the first value, is adopted.

3. The computer of claim 2, wherein the first step results in topological reconnection of shapes with edges smeared by diffusion and the second step results in sharpening of the edges after reconnection.

4. The computer method of claim 1, wherein the image function is a binary image function.

5. The computer of claim 1, wherein the image function is a greyscale image function.

6. The computer of claim 1, wherein said states are two greyscale states.

7. The computer of claim 1, wherein the differential equation is a modified Cahn-Hilliard equation represented by the formula $$u_t = -\Delta\left(\varepsilon\Delta u - \frac{1}{\varepsilon}W'(u)\right) + \lambda(\vec{x})(f - u)$$

wherein t represents the parameter, $\lambda(\vec{x})(f-u)$ represents the fidelity term and W(u) is a nonlinear potential function.

8. The computer of claim 7, wherein $$\lambda(\vec{x}) = \begin{cases} 0 & \text{if } \vec{x} \in D, \\ \lambda_0 & \text{if } \vec{x} \in \Omega \setminus D \end{cases}$$

D being the first domain and $\Omega$ being the second domain.

9. The computer of claim 1, wherein the two greyscale states are black and white of a printed text, respectively.

10. The computer on claim 1, further comprising:
    further applying at least one fast solver for numerical integration of the nonlinear potential function.

11. The computer of claim 10, wherein said at least one fast solver is a convexity splitting fast solver.

12. The computer of claim 1, wherein the damaged or missing regions comprise a double stripe.

13. The computer of claim 1, wherein the damaged or missing regions represent a cross.

14. The computer of claim 1, wherein the damaged or missing regions represent a sine wave.

15. The computer of claim 1, wherein the damaged or missing regions represent a road.

16. The computer of claim 1, wherein the differential equation is a sum of a first term and a second term, the first term optimizing for a match to known data outsize the second domain, the second term optimizing for separation of scales between different levels of the image.

17. The computer of claim 16, wherein the different levels of the image are two different binary levels.

* * * * *